US006832140B2

United States Patent
Fan et al.

(10) Patent No.: US 6,832,140 B2
(45) Date of Patent: Dec. 14, 2004

(54) OBTAINING VEHICLE USAGE INFORMATION FROM A REMOTE LOCATION

(75) Inventors: Rodric C. Fan, Fremont, CA (US); Kenny Man D. Nguyen, East Palo Alto, CA (US)

(73) Assignee: At Road, Inc., Fremont, CA (US)

( * ) Notice: Subject to any disclaimer, the term of this patent is extended or adjusted under 35 U.S.C. 154(b) by 0 days.

(21) Appl. No.: 10/095,368

(22) Filed: Mar. 8, 2002

(65) Prior Publication Data

US 2003/0171860 A1 Sep. 11, 2003

(51) Int. Cl.⁷ .............................................. G06F 19/00
(52) U.S. Cl. .......................... 701/33; 701/29; 340/439
(58) Field of Search .............................. 701/33, 32, 35, 701/200, 208, 213, 36, 24, 201, 202; 340/988, 989, 990, 995

(56) References Cited

U.S. PATENT DOCUMENTS

| | | | | |
|---|---|---|---|---|
| 5,438,517 A | * | 8/1995 | Sennott et al. | 701/213 |
| 5,815,093 A | * | 9/1998 | Kikinis | 340/937 |
| 6,028,537 A | * | 2/2000 | Suman et al. | 340/988 |
| 6,108,591 A | * | 8/2000 | Segal et al. | 701/1 |
| 6,131,060 A | * | 10/2000 | Obradovich et al. | 701/49 |
| 6,388,579 B1 | * | 5/2002 | Adcox et al. | 318/283 |
| 6,421,590 B2 | * | 7/2002 | Thibault | 701/35 |
| 6,434,510 B1 | * | 8/2002 | Callaghan | 702/165 |
| 6,535,743 B1 | * | 3/2003 | Kennedy et al. | 455/456.1 |
| 6,556,899 B1 | * | 4/2003 | Harvey et al. | 701/29 |

* cited by examiner

*Primary Examiner*—Marthe Y. Marc-Coleman
(74) *Attorney, Agent, or Firm*—MacPherson Kwok Chen & Heid LLP; Edward C. Kwok

(57) ABSTRACT

Presented are a method and a system by which an individual can obtain usage information of a vehicle. A mobile unit, which may be located inside a vehicle, receives data from a part of the vehicle (e.g., the odometer) and/or Global Positioning System satellites and derives parameters such as the velocity and the travel distance from the received data. Using these parameters, the mobile unit may determine time information such as the amount of time the vehicle is traveling, in idle, or in a parked state within a given time period. Alternatively, the mobile unit may transmit the parameters to a remote computer, which then determines the time information. When a user submits a query requesting a parameter or a mathematical operation on a parameter, either the mobile unit or a remote computer prepares a response and transmits the response to the appropriate user interface.

30 Claims, 10 Drawing Sheets

OBTAINING VEHICLE USAGE INFORMATION FROM A REMOTE LOCATION

BACKGROUND

1. Field of Invention

This invention relates to network communication systems and in particular to using network communication systems to obtain vehicle information.

2. Related Art

As economy becomes global and individuals become increasingly mobile, there is a concomitant rise in demand for transportation-dependent services. These transportation-dependent services include shipping/delivery services, moving services, and travel-related services such as commercial airlines, taxis, and limousines. Companies that provide transportation-dependent services face management challenges that stem from the fact that transportation units usually travel too far to be monitored closely. Often, these companies have little choice but to rely on employee reports to find out about the types of use the companies' transportation units are subjected to. If an employee leaves company site in a company track and returns several hours later, the employer cannot verify whether the employee was diligently carrying out his work responsibilities the entire time that he was gone. The difficulty in assessing employee diligence and the general lack of information about usage of company vehicles adversely affect the companies' operational efficiency.

A method and apparatus that allow a person who is not a vehicle passenger to obtain information about vehicle usage is needed.

SUMMARY

Presented are a method and a system by which an individual can obtain usage information of a vehicle without being a passenger in the vehicle. The system includes a mobile unit and a monitoring unit (e.g., a computer) that communicate with each other through a data network. In a first environment, the mobile unit, which may be located inside a vehicle, receives data from a part of the vehicle (e.g., the odometer) and processes the data to derive parameters such as the velocity and the travel distance. The mobile unit uses these parameters to determine the fraction of time the vehicle is traveling, in idle, or in a parked state within a predefined time period, either by processing the information itself or by transmitting the appropriate data to a remote computer.

In one embodiment, the mobile unit may use the Global Positioning System (GPS) to determine the location of the vehicle carrying the mobile unit. In this embodiment, the mobile unit calculates parameters such as the velocity and travel distance using changes in the vehicle location. Using these parameters, the mobile unit determines the travel time, idle time, and parked time of the vehicle in a substantially similar manner as in the first embodiment.

DETAILED DESCRIPTION

Presented is a system that allows a user to monitor vehicles from a remote monitoring unit. The vehicles included in the system carry a mobile unit with network connection that transmits data regarding vehicle usage such as location, velocity, and ignition status (on/off). Either a local database in the mobile unit or a remote database connected to the same network as the mobile unit stores the information. An individual can access the stored data via the network. For example, a user of the monitoring unit may submit a query to the mobile unit or the server and receive any of the stored data or results of specific calculations using the stored data. In one embodiment, the mobile unit has a user interface and provides a user of the mobile unit with query options similar to the query options provided to a user of the monitoring unit.

Figure 1:
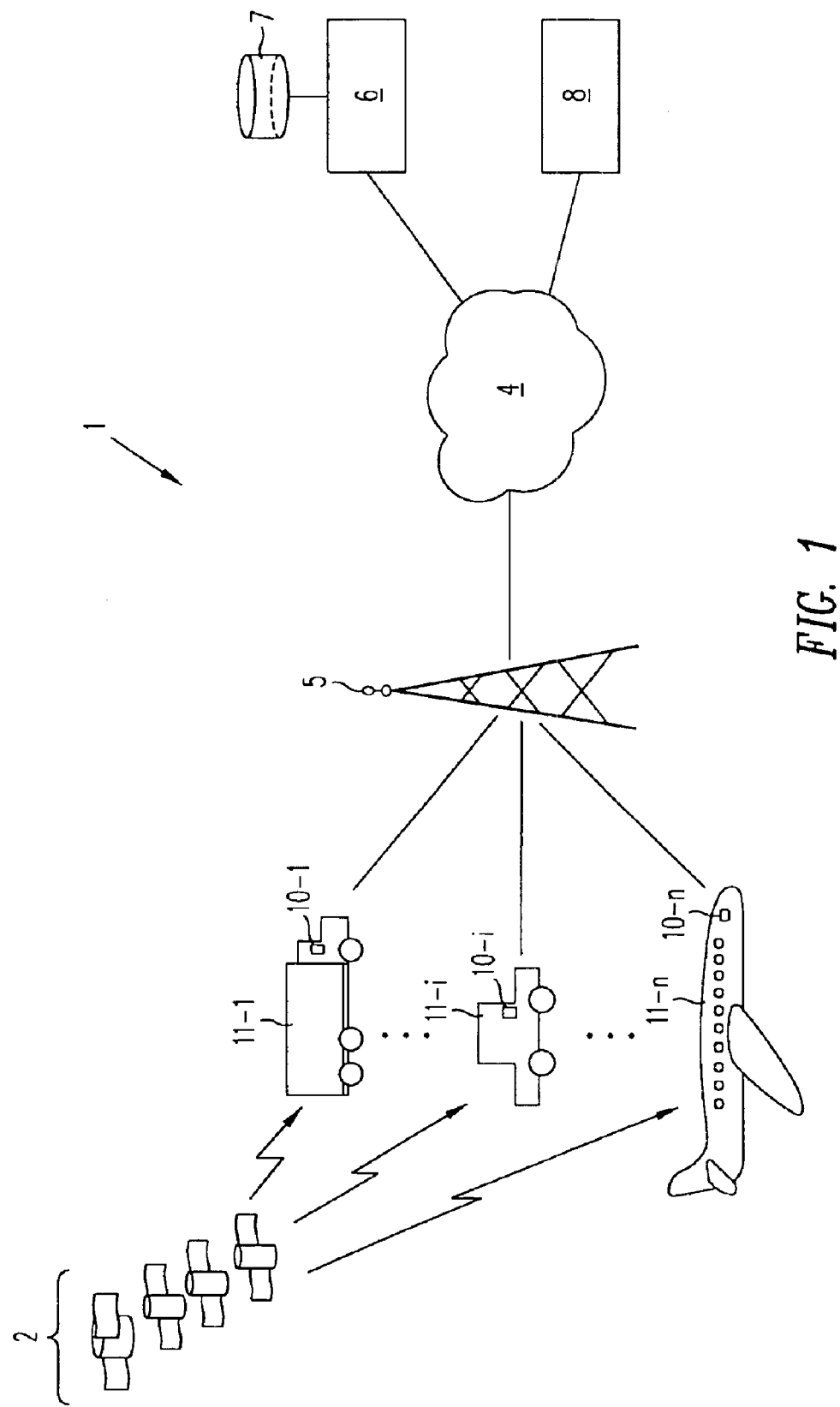
FIG. 1 depicts a vehicle information system, in accordance with one embodiment of the present invention.

FIG. 1 illustrates a vehicle information system 1 that utilizes GPS and a data network, in accordance with one embodiment of the present invention. Vehicle information system 1 includes GPS satellites 2, data network 4, communication link 5, server 6, monitoring unit 8, and mobile units 10-1 through 10-n, which are shown as black boxes inside vehicles 11-1 through 11-n, respectively. As used herein, mobile unit 10-i is one of mobile units 10-1 through 10-n and vehicle 11-i is the vehicle carrying mobile unit 10-i. A "vehicle," as used herein, transports a mobile unit from one place to another and include an automobile, a truck, a person, and an airplane. Each of mobile units 10-1 through 10-n receives and processes information. For example, each of mobile units 10-1 through 10-n may receive code sequences from GPS satellites 2 and derive current location information from the code sequences. After receiving and processing the information, mobile units 10-1 through 10-n forward the information to data network 4 via communication link 5. Data network 4 may be, for example, a local or wide area network or a telephone network. Communication link 5, which forwards the information to data network 4, may include but is not limited to a satellite link, a wireless network service station such as a CDPD or CDMA station, a small message service, or a conventional data and voice switching network. Server 6 and monitoring unit 8, which are connected to data network 4, can access the information through data network 4. Server 6 may include or be coupled to a database 7, which stores data received from mobile units 10-1 through 10-n. An individual may retrieve the information from server 6, monitoring unit 8, or mobile unit 10-$i$. Server 6, monitoring unit 8, and mobile unit 10-$i$ are herein collectively referred to as a "user interface." Further details on vehicle information system 1 are provided in U.S. Pat. No. 5,959,577 to Fan et al. entitled "Method and Structure for Distribution of Travel Information Using Network," which is herein incorporated by reference.

Figure 2:
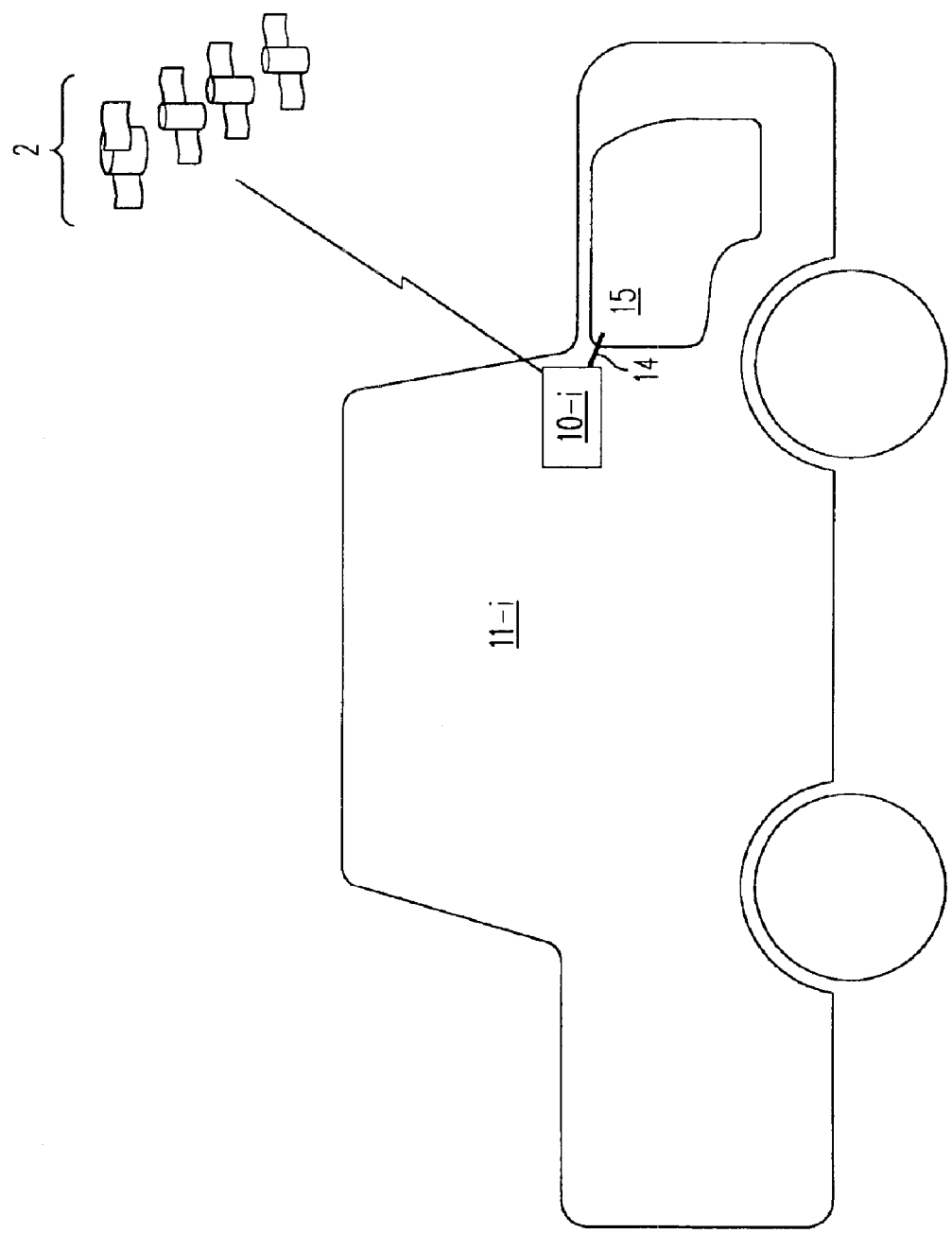
FIG. 2 depicts a mobile unit in a vehicle, in accordance with one embodiment of the present invention.

FIG. 2 depicts a mobile unit 10-$i$ installed or located in vehicle 11-$i$, in accordance with one embodiment of the present invention. Mobile unit 10-$i$ may be, for example, handheld by or attached to a passenger, hardwired into vehicle 11-$i$, or simply placed inside vehicle 11-$i$. Mobile unit 10-$i$, in addition to receiving data from GPS satellites 2, receives data from a vehicle part 15 to which it is connected by connection 14. Vehicle part 15 may be, for example, a part of the vehicle engine, a sensor cluster, an industry standard vehicle data or control bus, or a computer. Through connection 14, mobile unit 10-$i$ can receive various data regarding vehicle 11-$i$, such as the odometer reading, the fuel level, status of the vehicle doors (open/closed), or the status of the ignition (on/off).

Figure 3:
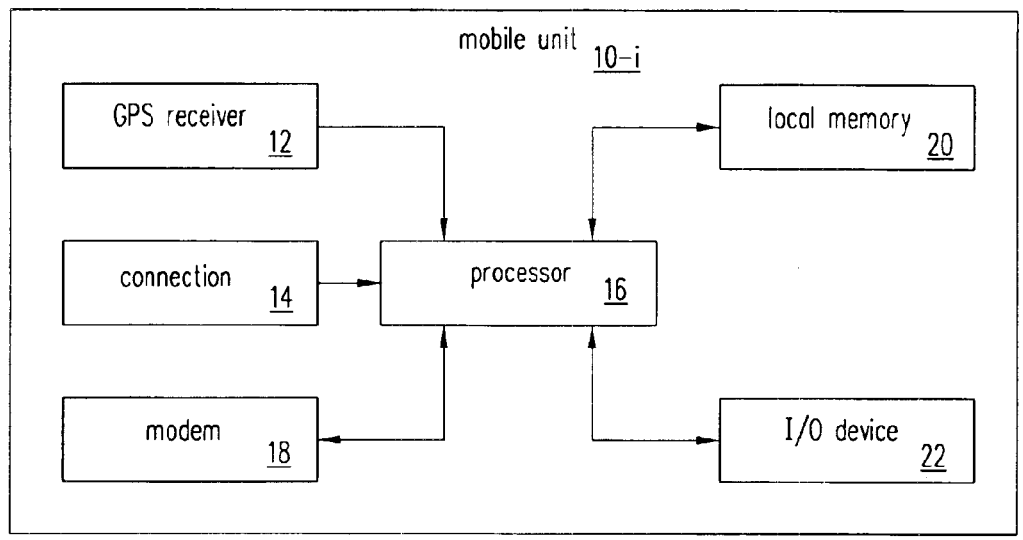
FIG. 3 depicts components of a mobile unit, in accordance with one embodiment of the present invention.

FIG. 3 provides components of mobile unit 10-$i$ in accordance with one embodiment of the present invention. Mobile unit 10-$i$ includes a GPS receiver 12, connection 14 to a part 15 of the physical unit in which mobile unit 10-$i$ is placed, processor 16, network connection 18, local memory 20, and I/O device 22. Processor 16 receives data from GPS receiver 12, vehicle part 15, network connection 18, local memory 20, and I/O device 22. In addition, processor 16 transmits data to network connection 18, local memory 20, and I/O device 22. Optionally, mobile unit 10-$i$ may be coupled to the battery of vehicle 11-$i$ so that it can be powered on or off independently of the ignition. Mobile unit 10-$i$ may also include a backup battery that automatically supplies power when the main power falls below operating voltage.

GPS receiver 12 finds GPS satellites 2 and receives code sequences transmitted by GPS satellites 2. The code sequences include positioning data which processor 16 uses to derive the location (e.g., longitude, latitude, and altitude) of mobile unit 10-$i$. This derivation may include, for example, triangulation. The positioning system is not limited to GPS but may be any alternative positioning system, such as time difference of arrival (TDOA), angle of arrival (AOA), ray tracing/pattern recognition, and any combination thereof, may be used. Through GPS receiver 12 or an alternative means for receiving positioning information, processor 16 continually (e.g., at a regular time interval) receives positioning data and is able to derive the location of mobile unit 10-$i$.

Connection 14 may electrically couple processor 16 to vehicle part 15 of the physical unit in which mobile unit 10-$i$ is located. Data may be received at a regular time interval or whenever a significant change occurs. Connection 14 is herein also referred to as "vehicle status bus."

Processor 16 may be implemented with any commercially available processors, such as Motorola's MC68331 processor. Processor 16 may use triangulation to convert the GPS code sequences to current location data by converting the GPS code sequences and applying correction factors, which may be stored in local memory 20. After correction factors are applied, the resultant location data may include a street address or latitude, longitude, and altitude. Processor 16 reformats the location data to an appropriate protocol (e.g., UDP/IP), and sends the data to data network 4 via network connection 18. Processor 16 receives the GPS code sequences, derives the location data, and either sends the location data to server 6 or stores the location data in a database in local memory 20. In one embodiment, processor 16 is configured to forward data to server 6 at a regular time interval, for example every minute.

Network connection 18 may include a modem or a CDPD, CDMA, GSM, iDEN, or AMPS module. Local memory 20 may include Flash, RAM, ROM, or a combination of such memory devices. Local memory 20 may include or be coupled to one or more databases. I/O device 22 may include but is not limited to a monitor and a keyboard, a Personal Digital Assistant, or a microphone and a speaker. Mobile unit 10-$i$ may automatically transmit information to data network 4 at a given time interval, or transmit information upon being triggered by a command entered through mobile unit 10-$i$ or monitoring unit 8. Mobile unit 10-$i$ may also include various components not explicitly described herein, such as a chipset and a RTC/system controller.

Figure 4:
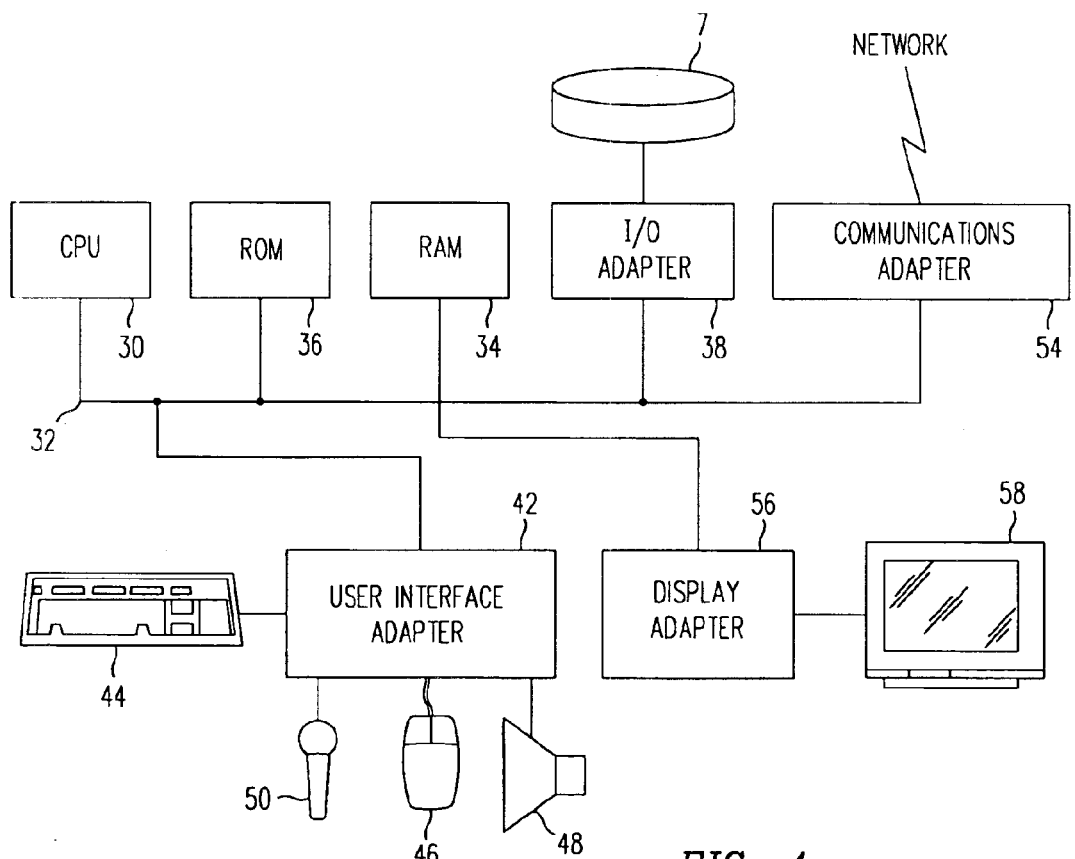
FIG. 4 shows a hardware environment suitable for a server and a monitoring unit, in accordance with one embodiment of the present invention.

FIG. 4 shows a hardware environment of server 6 and monitoring unit 8 in accordance with one embodiment of the present invention. Server 6 and monitoring unit 8 may each include a central processing unit 30, such as a microprocessor, and a number of other units interconnected via a system bus 32. Server 6 and monitoring unit 8 may each also include a Random Access Memory (RAM) 34, a Read Only Memory (ROM) 36, and an I/O adapter 38 for connecting peripheral devices such as database 7 to bus 32, a user interface adapter 42 for connecting a keyboard 44, a mouse 46, a speaker 48, a microphone 50, and possibly other user interface devices such as a Personal Digital Assistant (not shown) to bus 32, a communications adapter 54 for connecting the workstation to a communication network (e.g., a data processing network), and a display adapter 56 for connecting bus 32 to a display device 58. The computer typically runs an operating system such as Microsoft Windows NT™, 95™, 98™, Me™, 2000™, or XP™ Operating System, IBM OS/2™, Apple MAC™ OS, or UNIX operating systems such as HP-UX, Solaris, or Linux. Those skilled in the art will appreciate that the present invention may also be implemented on platforms and operating systems other than those mentioned above.

Figure 5:
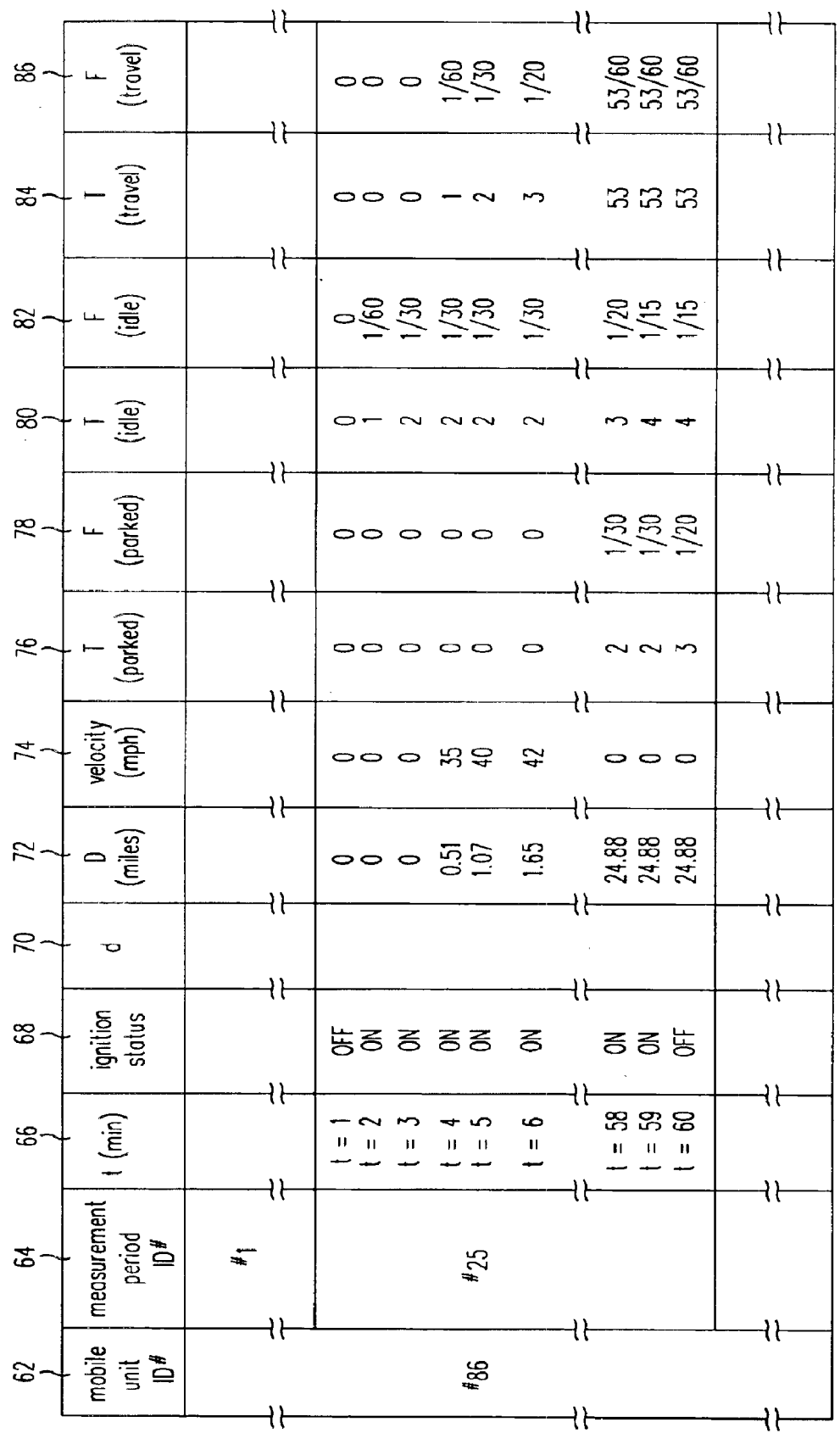
FIG. 5 depicts a table that may be used to maintain vehicle data, in accordance with one embodiment of the present invention.

FIG. 5 depicts an exemplary table 60, which processor 16 or processing unit 30 may use to maintain database 7 or a database coupled to local memory 20, in accordance with one embodiment of the present invention. Table 60 contains various measurements relating to mobile unit 10-$i$ and is indexed first by mobile unit identification number 62 and then by measurement period identification number 64. Each measurement period identification number refers to a specified measurement period T within which measurements are taken, e.g., at a regular time interval x. Thus, in one embodiment, data are taken at measured time t at the end of time interval x until specified measurement period T is over. In one embodiment, users may be allowed to select the time interval x at which measurements are taken. In this embodiment, the time interval x may differ from one measurement period to another. In measurement period identification #25 for mobile unit identification #86, x is approximately one minute since measured times t 66 are one-minute apart (t=1 minute, t=2 minutes, t=3 minutes, etc.). The fact that the last measurement for measurement period identification #25 is t=60 indicates that the measurement period T for measurement period #25 is approximately one hour (one minute×60 measurements). Table 60 also records ignition status 68, d 70, which may be a current location or an odometer reading depending on the embodiment, travel distance (D) 72, and velocity 74. Velocity 74 is calculated as depicted in the flowcharts of FIG. 6, FIG. 7A, and FIG. 7B.

In addition, table 60 keeps track of parked time 76, a ratio of parked time to measured time ("F(parked)") 78, idle time 80, a ratio of idle time to measured time ("F(idle)") 82, travel time 84, and a ratio of travel time to measured time ("F(travel)") 86. As used herein, "parked time" refers to a period during which a mobile unit's engine is turned off and velocity is zero, "idle time" refers to a period during which a mobile unit's engine is turned on and velocity is zero, and "travel time" refers to a period during which a mobile unit's engine is turned on and velocity is nonzero. The method of obtaining these values is described below, in reference to FIG. 8. Depending on the embodiment, table 60 may maintain a complete set of measurement data, selected measurement data, or just the most recent set of measurement data for a measurement period T.

The values for t=1 in table 60 indicate that for the first minute of measurement period #25, the vehicle's engine was turned off (ignition status 68 OFF) and the vehicle was stationary (velocity 74=0). At that time, the ratio of parked time to measured time t 78 is 100% (1/1). Sometime during the second minute of measurement period #25, the engine was turned on, as indicated by a change in ignition status 68 to ON. Apparently, the vehicle remained stationary for approximately two minutes after the engine was turned on, as indicated by two minutes of zero velocity 74. After the third minute, mobile unit 10-i began moving, as indicated by nonzero velocity 74 and the attendant nonzero travel time 84. Toward the end of measurement period #25, mobile unit 10-i remained idle for a few minutes before turning off the engine at t=60 minutes. Since ratios 78, 82, and 86 are calculated with measured time t and not measurement period T as the denominator, a user who submits a query in the middle of a measurement period T can obtain ratios that accurately reflect the vehicle activities up to the point in time when the query was processed. Different ratios can be used to meet user preferences.

Figure 6:
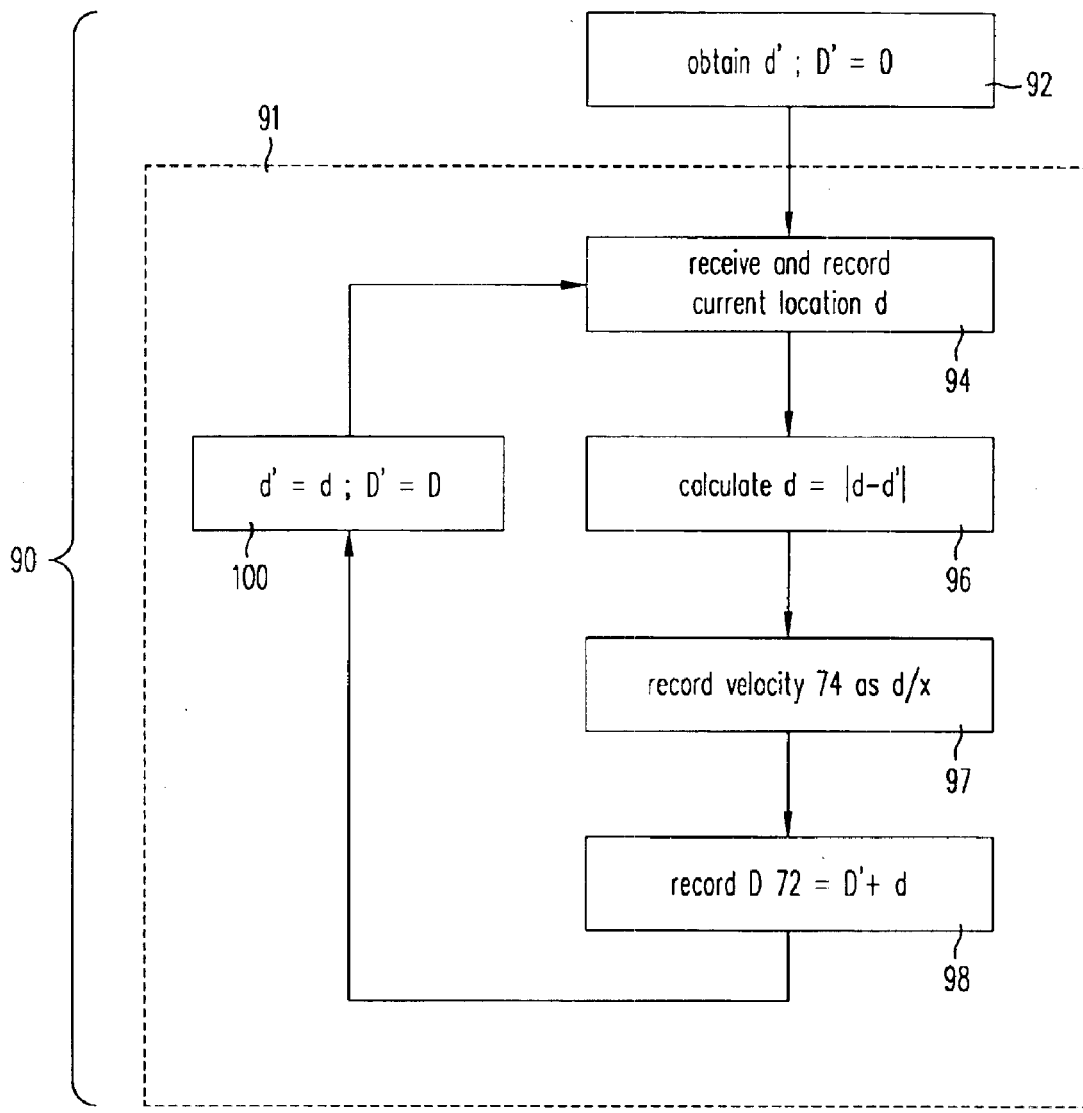
FIG. 6 depicts a GPS-based distance determination process for determining location-related parameters, in accordance with one embodiment of the present invention.
Figure 7A:
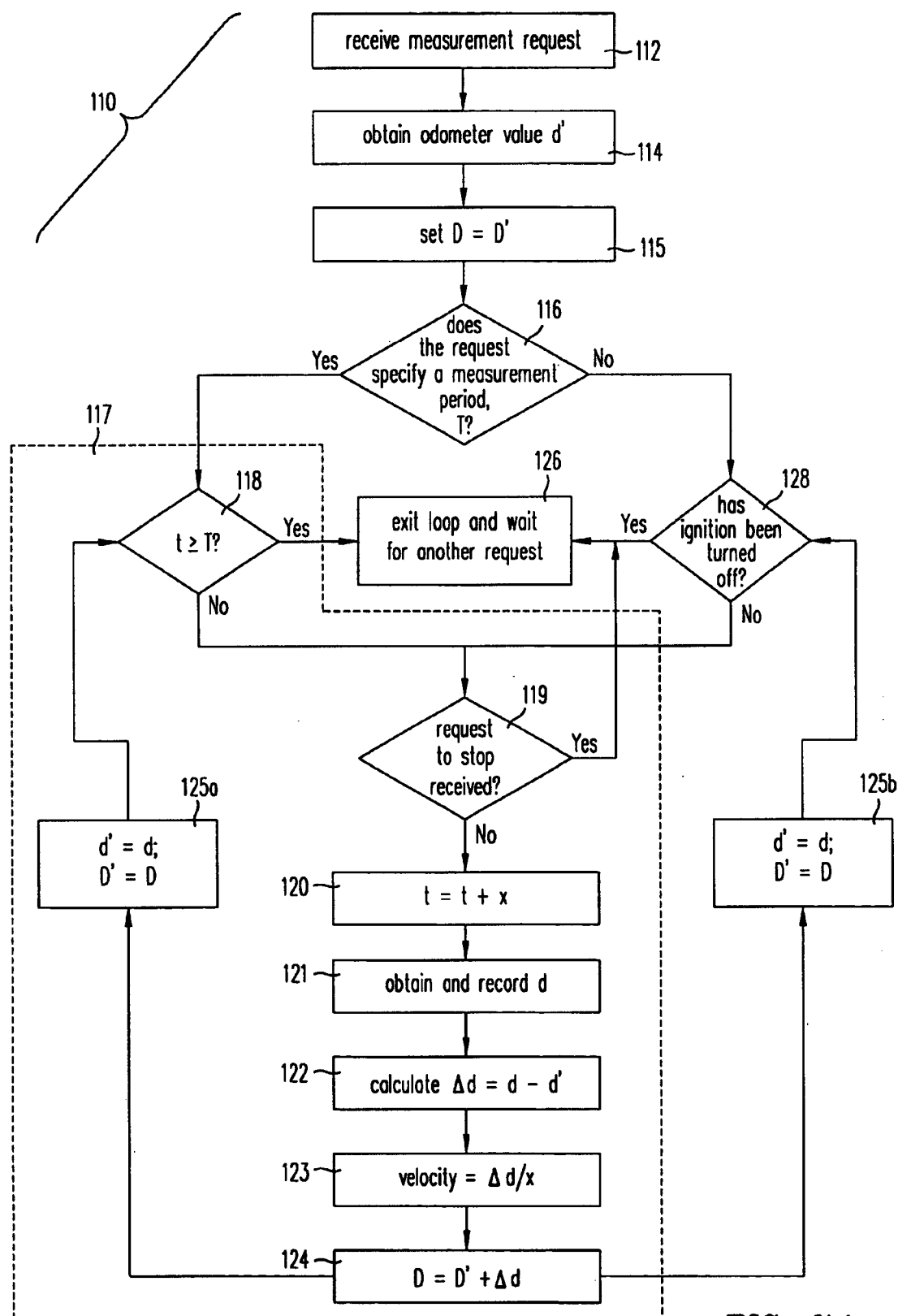
FIG. 7A and FIG. 7B depict an internal connection-based distance determination process for determining distance-related parameters, in accordance with one embodiment of the present invention.
Figure 7B:
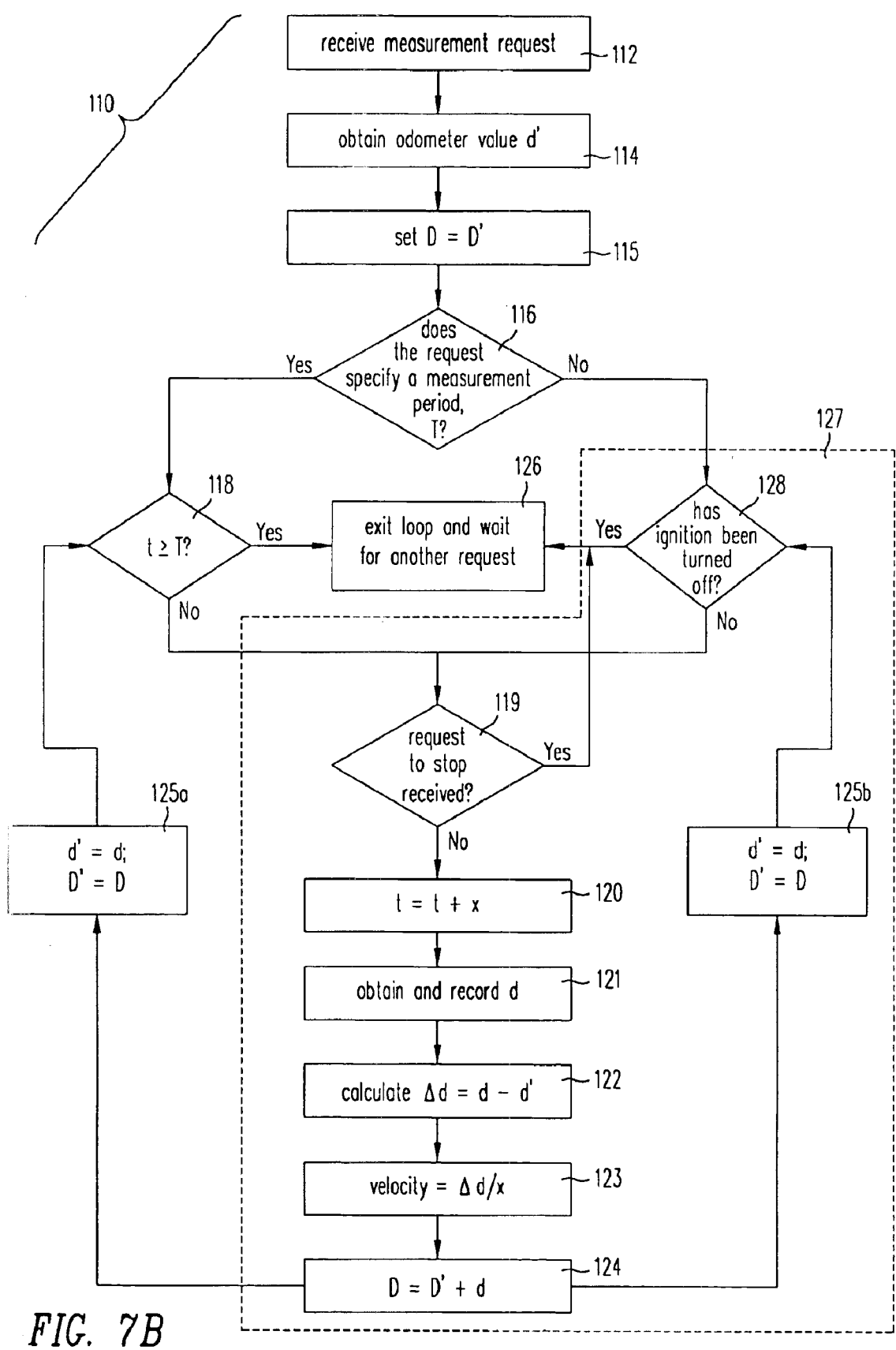

FIG. 6 depicts a GPS-based distance determination process 90 by which processor 16 uses GPS to determine travel distance 72, in accordance with one embodiment of the present invention. In one embodiment, processor 16 uses information received from GPS satellites 2 to determine the current location at time interval x and records the location as d 70 in table 60. At the beginning of GPS-based distance determination process 90, processor 16 assigns the value zero to previous travel distance D', and assigns the location at the time a measurement request is received to the previous location d' (stage 92). After assigning values to D' and d', processor 16 begins loop 91, which is repeated at time interval x. Whenever processor 16 receives code sequences from GPS satellites 2, it derives current location d (stage 94) and records the result as d 70 in table 60. Processor 16 uses current location d to calculate the distance between the current location d and the previous location d' (stage 96), which is shown as Δd and indicates the distance traveled during a specific time interval x. Processor 16 then divides Δd with x and records the result as velocity 74 in table 60 (state 97). Thereafter, processor 16 adds Δd to previous travel distance D' to obtain travel distance D (stage 98) and records the result as travel distance 72 in table 60. Before repeating loop 91, processor 16 assigns the value of the current location d to the variable d', which indicates the previous location (stage 100), so that the current location variable d can be assigned a new current location value during the next cycle of loop 91. Processor 16 repeats loop 91, each time collecting and recording current location 70, velocity 74, and travel distance 72 until either a specified measurement period T is reached or a request to stop measurements is received.

FIGS. 7A and 7B depict an internal connection-based distance determination process 110 by which processor 16 determines travel distance 72 and velocity 74, in accordance with one embodiment of the present invention. Upon receiving a measurement request (stage 112), processor 16 obtains an odometer reading through connection 14 and assigns the read value to the variable d' (stage 114). Processor 16 also sets the value of previous travel distance D' to zero (stage 115).

If the measurement request specifies a measurement period T (stage 116), processor 16 starts a cycle of loop 117 (shown by dark broken lines) by first determining whether the specified measurement period T has been (stage 118). If the specified measurement period T has not been, processor 16 checks to see if a request to stop measurements is received (stage 119). A user may send a request to stop measurements any time. If no such request is received, processor 16 increments a measured time t by a time interval x (stage 120), and obtains and records an odometer reading d (stage 121). Using the new odometer reading d, processor 16 calculates the interval travel distance Δd (stage 122), which is then used to calculate the velocity (stage 123) and travel distance (stage 124). The velocity and the travel distance calculated in stages 123 and 124, respectively, may be recorded as D 72 and velocity 74 in table 60. Then, processor 16 assigns the values of odometer reading d and travel distance D to the variables d' and D' respectively (stage 125a). After stage 125a, the variables d and D are prepared to accept values calculated during a subsequent cycle of loop 117. During the subsequent cycle of loop 117, processor 16 compares the measured time t with the specified measurement period T again (stage 118) and repeats stages 119 through 125a if t<T.

When the specified measurement period T is reached (i.e., t≧T) or a request to stop measurements is received in stage 119, processor 16 exits loop 117 and waits for another request (stage 126).

FIG. 7B depicts a loop 127, which is executed instead of loop 117 if a measurement period T is not specified in the measurement request. Processor 16 begins loop 127 by determining whether ignition status 68 is currently "OFF" (stage 128). If ignition status 68 is "ON," processor 16 executes stages 119 through 125b, which are substantially similar to stages 119 through 125a of loop 117. Measured time t is incremented by time interval x for each cycle (stage 120) in order to maintain the database (e.g., measured time 66 of table 60) even though measured time t is not compared with another value. When ignition status 68 is "OFF," processor 16 exits loop 127 and waits for another request (stage 126).

Figure 8A:
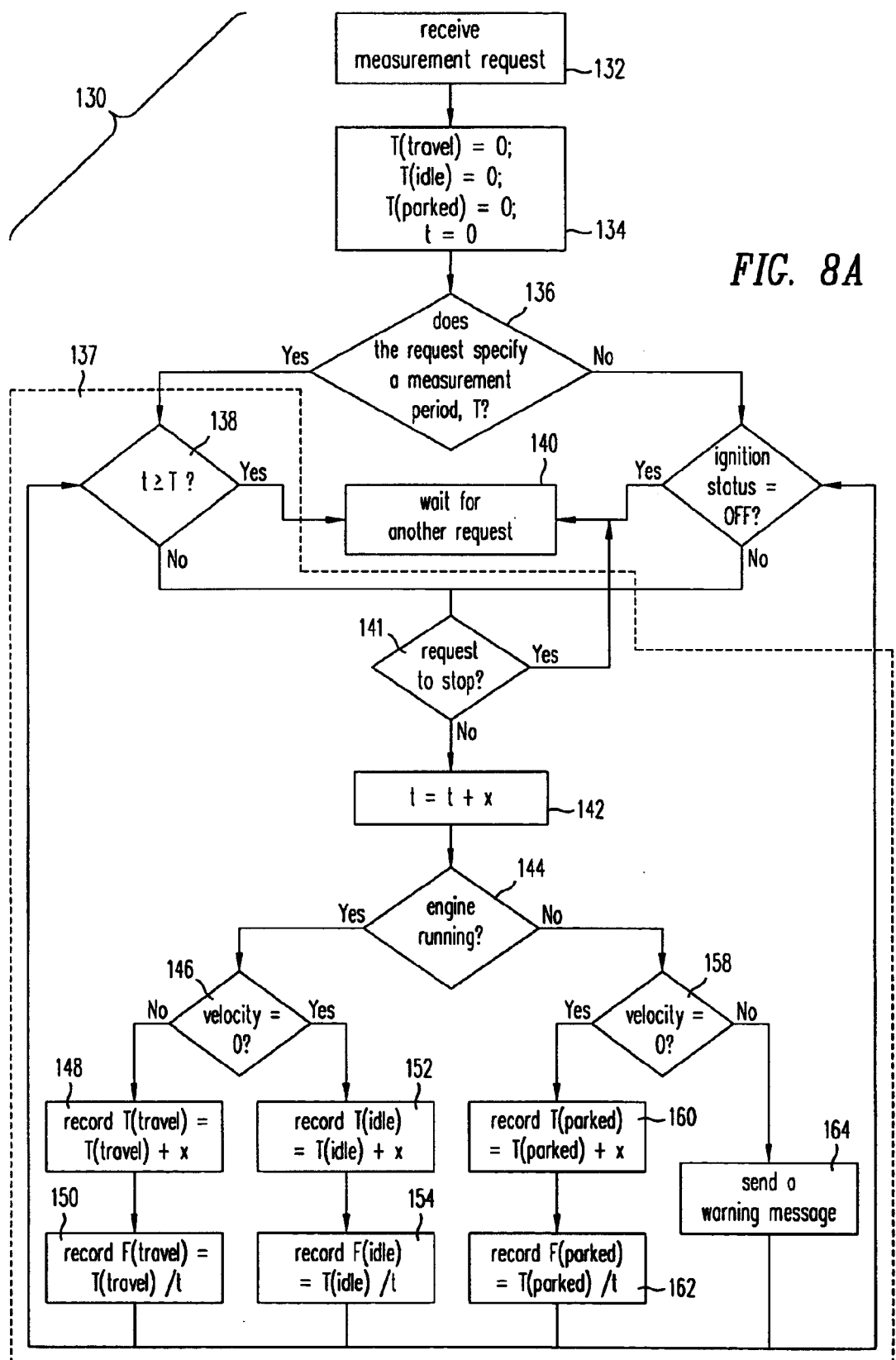
FIG. 8A and FIG. 8B depict a process for determining the amount and the fraction of idle time, travel time, and parked time, in accordance with one embodiment of the present invention.
Figure 8B:
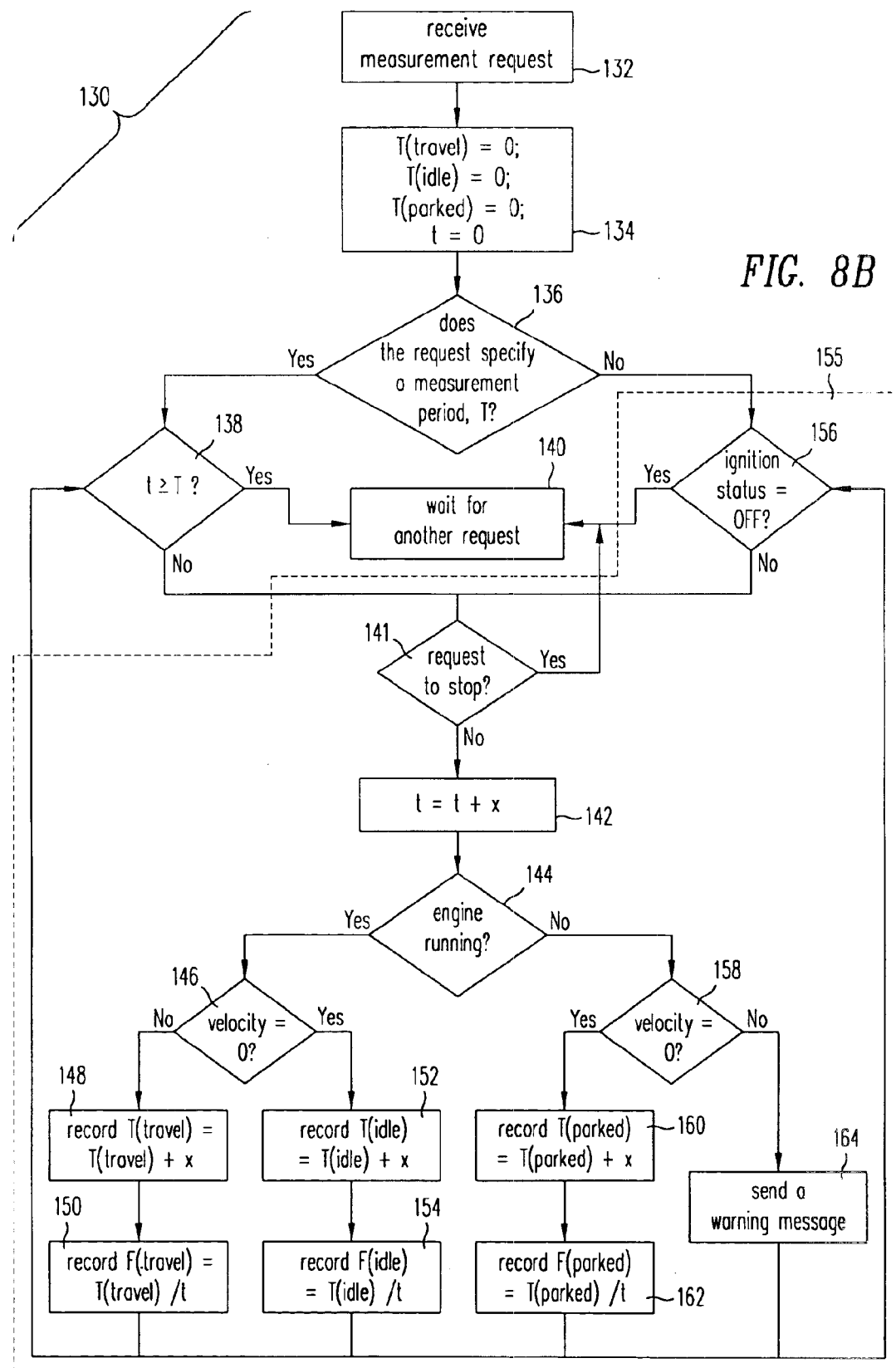

FIG. 8A and FIG. 8B depict a time calculation process 130 by which processor 16 determines the amount and the fraction of idle time, travel time, and parked time, in accordance with one embodiment of the present invention. Time calculation process 130 is triggered by receipt of a measurement request submitted through a user interface (stage 132). Upon receiving the measurement request, processor 16 sets measured time t, travel time T(travel), idle time T(idle), and parked time T(parked) to zero (stage 134). Processor 16 also determines whether the request specifies a measurement period T (stage 136). If the request specifies a measurement period T, processor 16 begins a loop 137 shown in FIG. 8A whereby it repeatedly measures parameters such as travel time, idle time, and parked time at time interval x until the specified measurement period T is reached. If the request does not specify a measurement period T, processor 16 enters loop 155 shown in FIG. 8B and repeatedly measures parameters such as travel time, idle time, and parked time at time interval x until ignition status 68 is "OFF." Even if the specified time period T is not over and ignition status 68 is "ON," a user may exit loop 137 or loop 155 any time by putting submitting a request to stop measurements.

FIG. 8A depicts loop 137 (shown by dark broken lines) in accordance with one embodiment of the present invention. At the top of loop 137, processor 16 compares the measured time t against the specified measurement period T to determine whether the specified measurement period T has been reached (stage 138). If the specified measurement period T has been reached, processor 16 exits loop 137 and waits until a new measurement request is received (stage 140). On the other hand, if the specified measurement period T has not yet been reached, processor 16 continues forward to the next stage in loop 137 and checks if a request to stop measurements has been received from a user interface (stage 141). If no such request has been received, processor 16 increments the measured time t by a predetermined time interval x (stage 142) and determines the ignition status (stage 144). If ignition status 68 is "ON," processor 16 checks velocity 74 of mobile unit 10-*i* (stage 146), which may have been obtained and recorded through one of the processes in FIG. 6, FIG. 7A, or FIG. 7B. If velocity 74 is a nonzero value, processor 16 concludes that mobile unit 10-*i* is traveling, adds time interval x to the travel time T(travel) from a previous measured time t (stage 148), and records the result as T(travel) 84 for the current measured time t in table 60. Using the updated travel time T(travel), processor 16 calculates a new ratio of travel time to measurement time and records the value as F(travel) 86 in table 60 (stage 150). If processor 16 determines that velocity is zero in stage 146 by using one of the methods in FIG. 6, FIG. 7A, or FIG. 7B, processor 16 adds time interval x to idle time T(idle) and records the results as T(idle) 80 for that measured time (stage 152). Then, based on the incremented idle time T(idle), processor 16 calculates a new fraction F(idle), which indicates the amount of time the vehicle has been idle thus far in the measurement period, and records F(idle) 82 in table 60 (stage 154). After the updated parameters have been calculated and recorded, processor 16 returns to stage 138 and again compares the measured time t against specified measurement period T to make sure the specified measurement period T has not passed.

If processor 16 determines in stage 144 that the engine is not running, processor 16 checks the velocity of mobile unit 10-*i* (stage 158). If the velocity is zero, processor 16 adds time interval x to parked time and records the result as (stage 160). T(parked) 76 in table 60. Based on the updated parked time, processor 16 calculates the fraction indicating the time thus far that the vehicle containing mobile unit 10-*i* has been parked (stage 162) and records the result as F(parked) 78 in table 60.

If the velocity is nonzero in spite of the engine being turned off, processor 16 sends a warning message (stage 164), for example to a user interface unit. Processor 16 repeatedly executes loop 137 until either the specified measurement period T is over or a request to stop measurements is received, in which case processor 16 breaks out of loop 137 and waits for a another request (stage 140). In this embodiment, a warning message is sent off at a regular time interval x as long as processor 16 is repeatedly executing loop 137. In another embodiment, time calculation process 130 may be designed so that processor 16 exits loop 137 when it sends a warning message.

FIG. 8B depicts a loop 155 (shown by dark broken lines), in accordance with one embodiment of the present invention. Loop 155 is substantially similar to loop 137 of FIG. 8A except that instead of repeatedly executing the loop every time interval x until a specified time period T is reached, processor 16 repeatedly executes the loop until ignition status 68 is "OFF" (stage 156).

In one embodiment, processes 90, 110, and 130 are at least partly executed by processing unit 30 instead of processor 16. Processing unit 30 may receive data from mobile units 10-1 through 10-*n* via data network 4 and carry out processes 90, 110, and 130.

Figure 9:
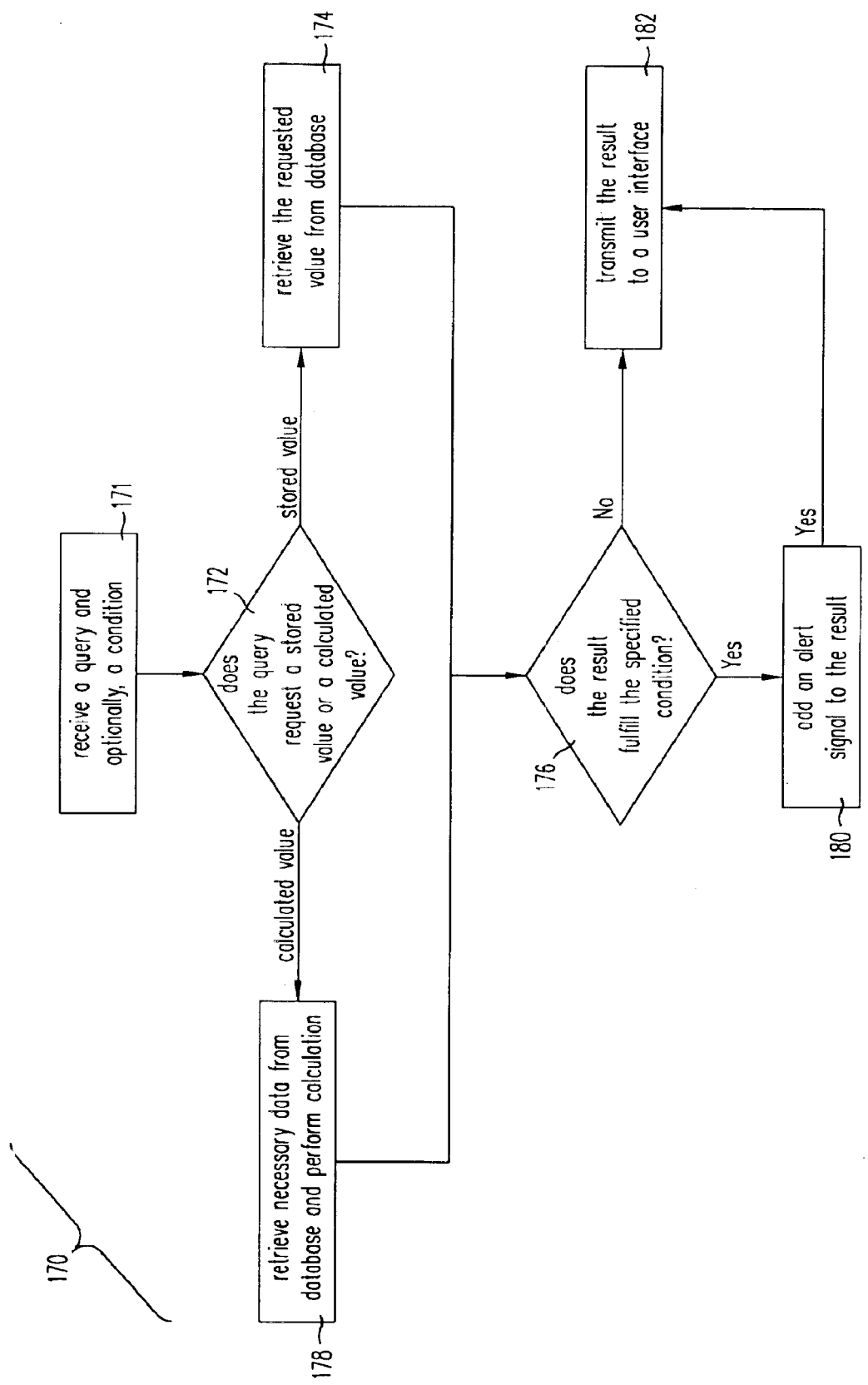
FIG. 9 depicts a process for responding to a user query, in accordance with one embodiment of the present invention.

FIG. 9 depicts a query response process 170 by which processing unit 30 responds to a user query. A user query, which is usually submitted through a user interface, reaches processing unit 30 through data network 4. A user query may include a request for information such data stored in table 60, a request for information derived from the stored data, or a request to be notified if a condition is met. Upon receiving the user query and optionally a condition (stage 171), processing unit 30 sorts the query into a group that requests stored data and another group that requests calculation using stored data (stage 172). If a query requests stored data, processing unit 30 retrieves the appropriate values from a database (e.g., table 60) (stage 174) and transmits the retrieved result to the user interface from which the query was received (stage 182). If a query includes a condition or a request for calculation, processing unit 30 makes the necessary calculation (stage 178) and checks if the result fulfills the condition (stage 176). If the condition is not fulfilled, processing unit 30 may transmit a response that includes the result of a calculation or a response that simply says the condition is not met (stage 182). On the other hand, if the condition is fulfilled, processing unit 30 may add a notification or an alert signal to the result of the calculation (stage 180) before transmitting a response to a user interface (stage 182).

A user of mobile unit 10-*i* or monitoring unit 8 can submit a query requesting any of the data in table 60. In one embodiment, the user can also request parameters that can be derived using the data in table 60, such as a ratio of idle time to travel distance (T(idle) 80/D 72) or a ratio of idle time to travel time (T(idle) 80/T(travel) 84). In another embodiment, the user can program processor 16 with a condition or enter a condition through a user interface and request to be warned if the condition is satisfied. Vehicle information system 1 may be used, for example, by a delivery service company to learn about the usage of the company's delivery vehicles. A manager may enter a measurement request into mobile unit 10-*i* before an employee leaves a company site in a company delivery vehicle 11-*i* so that mobile unit 10-*i* receives, processes, and transmits data while the employee is performing his deliveries. When the employee returns to the company site, the manager can retrieve the record of vehicle usage from a database, e.g., table 60, and question the employee about any unusual or unexpected patterns. Furthermore, the manager may submit a query including a request to be notified if a certain condition is fulfilled. For example, the manager requests to be notified if the ratio of T(idle) 80 to T(travel) 84 is less than ⅓. Using the query process, the manager take appropriate measures to decrease inefficient idle time.

Although the present invention is described using the above embodiments, the scope of the invention is not limited by the embodiments provided herein. Numerous variations and modifications are possible within the scope defined by the following claims.

What is claimed is:

1. A method of maintaining vehicle usage information, said method comprising:

receiving a measurement request through a user interface of a monitoring unit on-board the vehicle;

receiving at said monitoring unit operational information through a vehicle status bus of a vehicle, said information comprising data regarding the operation of said vehicle;

receiving positioning information through a receiver of a positioning signal in said monitoring unit;

in said monitoring unit, in accordance with the measurement request, processing said operational information to obtain values of one or more operational parameters, and processing said positioning signal to obtain a location of said vehicle and values of one or more motion parameters regarding the motion of said vehicle; and transmitting said operational information from said monitoring unit, said location and said values of said operational and motion parameters over a data network to be stored in a database for query by another via a user request over said data network.

2. The method of claim 1, further comprising storing said values of said operational and motion parameters in said database.

3. The method of claim 1, wherein said positioning information comprises Global Positioning System code sequences and said motion parameter comprises at least one of: a velocity of said vehicle, and a travel distance of said vehicle within a predefined time period.

4. The method of claim 1, wherein said operational parameters comprise information regarding an ignition status of said vehicle.

5. The method of claim 1, further comprising determining values of a third type of parameters based on said values of said operational and motion parameters.

6. The method of claim 5, wherein said third type of parameters comprises at least one of: idle time, travel time, and parked time of said vehicle within a predefined time period.

7. The method of claim 6, further comprising:
performing a mathematical operation on values of at least one of said operational parameters, said motion parameters, and said third type of parameters in response to a said user request; and transmitting a result of said mathematical operation to a sender of said user request.

8. The method of claim 7, wherein said mathematical operation comprises:
comparing a first value indicated in said user request against a second value; and indicating in said result whether said first value and said second value fulfill a predefined relationship.

9. The method of claim 1, wherein said operational information comprises an ignition status and an odometer reading of said vehicle.

10. The method of claim 9, wherein said processing said operational information further comprises calculating a parameter based on said odometer reading.

11. The method of claim 10, wherein said calculated parameter comprises at least one of: a velocity and a travel distance of said vehicle within a predefined time period.

12. The method of claim 11, wherein said predefined time period is defined by said ignition status.

13. The method of claim 11, further comprising storing at least one of: said ignition status, said odometer reading, said velocity, and said travel distance in a database.

14. The method of claim 11, further comprising deriving another parameter from at least one of said ignition status, said odometer reading, said velocity, and said travel distance.

15. The method of claim 10, further comprising:
performing a mathematical operation on said calculated parameter in response to a said user request; and transmitting a result of said mathematical operation to a sender of said user request.

16. The method of claim 15, wherein said mathematical operation comprises:
comparing a first value indicated in said user request against a second value; and indicating in said result whether said first value and said second value fulfill a predefined relationship.

17. An apparatus for tracking vehicle usage of a vehicle, said apparatus being provided on-board said vehicle comprising:
a user interface for receiving a measurement request;

an interface to a vehicle status bus coupled to receive from sensors installed in said vehicle operation information of said vehicle;

a receiver of a positioning signal;

a processor connected to said interface to said vehicle status bus and said receiver, said processor receiving from said user interface said measurement request and in accordance therewith processing (a) said operational information received on said vehicle status bus to obtain values of operational parameters of said vehicle, and (b) said positional signal to obtain a location of said vehicle, and values of motion parameters relating to the motion of said vehicle; and a transmitter connected to said processor for transmitting said location and said values of said operational and motion parameters;

wherein, using said transmitter, said processor further provides an interface over a data network between said apparatus and a database, such that location and said values of said operational and motion parameters are accessible by another via a user request over said data network.

18. The apparatus of claim 17, further comprising a database accessible by said processor, said database storing values of at least one of said operational and motion parameters.

19. The apparatus of claim 17, wherein said values of said operational parameters comprise an ignition status of said vehicle.

20. The apparatus of claim 17, wherein said motion parameter comprises at least one of: a velocity, and a travel distance of said vehicle.

21. The apparatus of claim 17, further comprising determining values of a third type of parameters based on said operational and motion parameters.

22. The apparatus of claim 21, wherein said third type of parameters comprises at least one of: idle time, travel time, and parked time of said vehicle within a predefined time period.

23. The apparatus of claim 22, wherein said processor performs a mathematical operation on values of at least one of said operational and motion parameters and said third type of parameters in response to a said user request and transmits a result to a sender of said user request.

24. The apparatus of claim 23, wherein said mathematical operation comprises comparing a first value indicated in said user request against a second value to determine whether said first value and said second value fulfill a predefined relationship.

25. The apparatus of claim 17, wherein said operational information includes at least one of an ignition status and an odometer reading.

26. The apparatus of claim 25, wherein said processor calculates from said operational information values of a parameter comprising at least one of a velocity and a travel distance of said vehicle within a predefined time period.

27. The apparatus of claim 26, wherein said predefined time period is defined by the ignition status.

28. The apparatus of claim 26, further comprising a database accessible by said processor, said database storing said values of said calculated parameter.

29. The apparatus of claim 26, wherein said processor performs a mathematical operation on said calculated parameter in response to a said user request and transmits a result of said mathematical operation to a sender of said user request.

30. The apparatus of claim 29, wherein said mathematical operation comprises:
  comparing a first value indicated in said user request against a second value; and
  indicating in said result whether said first value and said second value fulfill a predefined relationship.

* * * * *